C. V. SIEGERT.
ADJUSTABLE TRACTOR PLOW HITCH.
APPLICATION FILED AUG. 24, 1918.
1,320,937.
Patented Nov. 4, 1919.
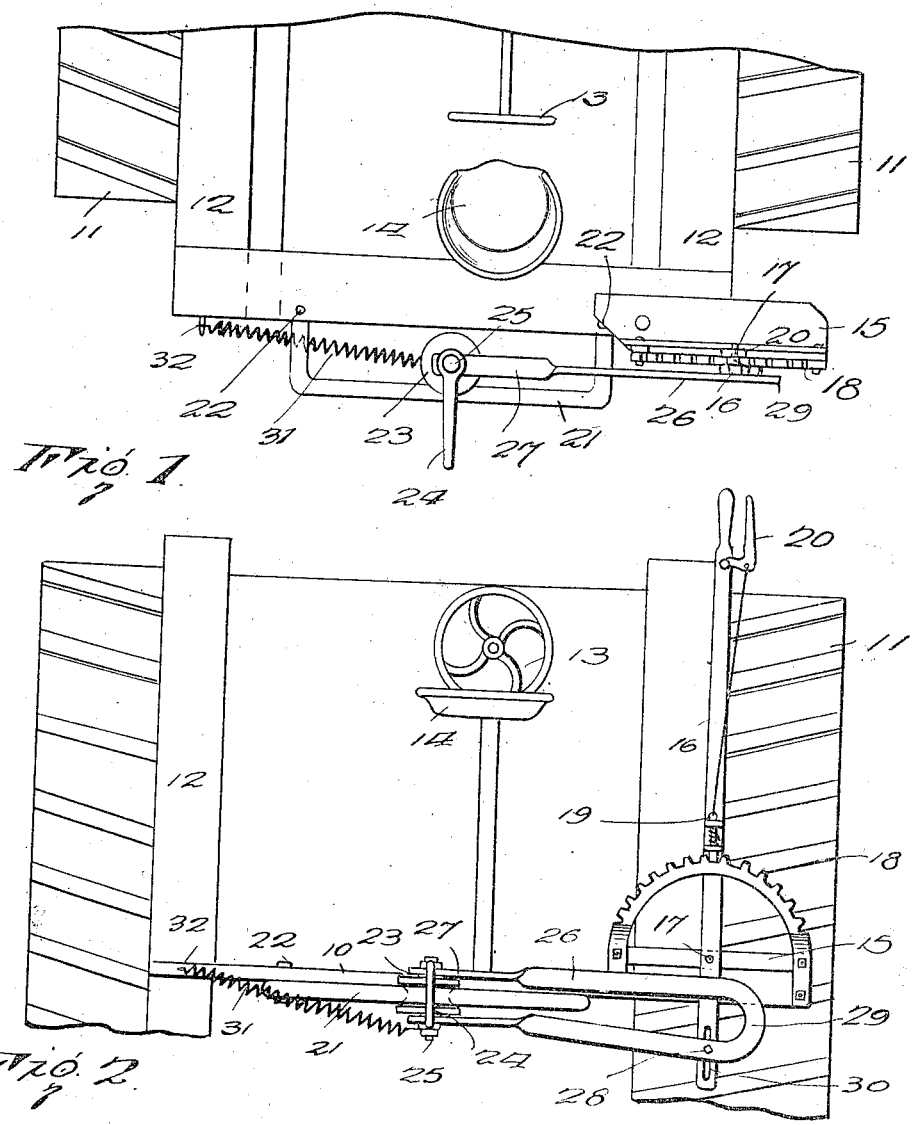
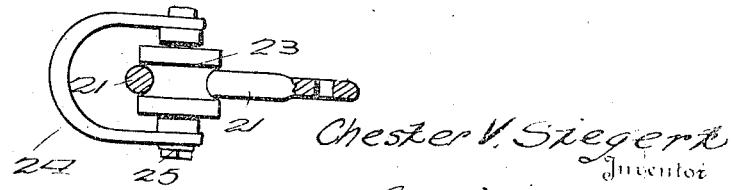

UNITED STATES PATENT OFFICE.

CHESTER V. SIEGERT, OF GRAYVILLE, ILLINOIS.

ADJUSTABLE TRACTOR PLOW-HITCH.

1,320,937.  Specification of Letters Patent.  Patented Nov. 4, 1919.

Application filed August 24, 1918. Serial No. 251,274.

*To all whom it may concern:*

Be it known that I, CHESTER V. SIEGERT, a citizen of the United States, residing at Grayville, in the county of White and State of Illinois, have invented certain new and useful Improvements in Adjustable Tractor Plow-Hitches, of which the following is a specification.

This invention relates to an improved hitch for connecting a plow with a tractor, and the object thereof is to provide a hitch which is adjustable so as to be operated from the driver's seat of the tractor so that the plow will take more or less ground, without checking the tractor.

A further object of the invention is to provide an adjustable plow hitch for tractors so as to regulate the depth of action of the plows, permitting the plows to take more or less ground without stopping the tractor, the device being adapted for especial use when plowing on hillsides in corn ridges or when finishing up the land.

A still further object of the invention is to provide a plow hitch of the character specified which may be used on various types of tractors so that the draft connection between the plow and the tractor can be shifted transversely of the tractor for the purposes specified, the device being simple in construction, strong and durable and capable of being quickly attached to the tractor for the purposes specified.

With the above objects and others in view, as will appear as the description proceeds, the invention comprises the novel features of construction, combinations of elements and arrangement of parts which will be more fully described in the following specification and set forth with particularity in the claims appended hereto.

Reference is had to the accompanying drawings, forming a part of this application, wherein like reference characters will designate corresponding parts throughout the several views, in which—

Figure 1 is a plan view of the ear portion of a tractor equipped with my improved adjustable plow hitch, Fig. 2 is a rear elevation thereof, and Fig. 3 is a detail fragmentary cross sectional view of the hitch or draft connection.

Referring to the drawings in detail, the numeral 10 designates the frame of a tractor having the drive wheels 11 with suitable guards 12 arranged over the same if desired.

The steering wheel of the tractor is shown at 13 and the driver's seat is designated at 14 in convenient position upon the rear of the frame to actuate the steering wheel and other mechanism controlling the motor and operation of the tractor and also the improved adjustable hitch, as will now be described.

Supported upon the frame 10 at one side is an angular attaching plate 15 to which a throw lever 16 is pivoted as shown at 17, said plate 15 also supporting a notched segment 18 with which the latch mechanism 19 of the throw lever coöperates, in order to hold the lever in adjusted angular position laterally of the tractor. The latch mechanism is capable of operation through the medium of a handle 20 in the usual manner, and as shown, the lever projects below the pivot point 17 in rear of the tractor wheel at one side of the tractor, the segment being offset rearwardly to admit the lever forwardly of the notched portion thereof.

Also supported upon the rear portion of the frame, is a guide member 21 substantially U-shaped and having the end portions thereof extended forwardly and attached to the frame, by vertically disposed fastening means or bolts 22. This guide member is sufficiently strong to take the draft strain and is substantially circular in cross section. Fitted between the rear edge of the frame 10 and the transverse portion of the guide member 21 is a pulley 23 to which a clevis 24 is connected through the medium of a vertical pin 25 also rotatably receiving the pulley thereon, the usual drawbar being designed for connection with the clevis so as to attach the plow in order to permit the latter to be advanced across the field.

In order to shift the draft connection, a yoke 26 is provided, said yoke consisting of a flat section of metal having the end portions 27 thereof twisted at right angles for connection with the pin 25 above and below the pulley 23, the yoke extending in the direction of the lever and having pivotal connection therewith through the medium of a bolt or pin 28 at the bottom portion below the bight portion 29 of the yoke. The lever is also provided with a longitudinal slot 30, so as to compensate for the movement of the lever in an arc upon the pivot 17, as the lever is shifted, to move the pulley along the guide and draft attachment 21, so as to shift the hitch transversely of the tractor to make the plow take more or less ground, without checking the movement of the tractor. This is especially useful in connection with plowing on hillsides, in corn ridges or in finishing up the land, as the draft connection may be shifted to any desired position along the guide member 21 and the latch mechanism brought into play to hold the pulley in adjusted position. The pulley will roll along the guide member 21 and is held normally to the left hand side of said guide member under the action of a coiled retractile spring 31 connected at one end to the frame as shown at 32 and to the pin 25 at the lower end thereof. When it is desired to hitch it is necessary to release the latch member of the lever and on actuating said lever the pulley can be moved in the guide member 21 either to bring the same to the center line of draft or to the right hand side thereof, as will be clearly apparent. The spring serves to move the pulley from the right hand side of the guide member toward the left hand side thereof when the latch on the lever has been released from the segment. When moving the pulley from the left hand side of the guide member 21 to the right hand side thereof the lever is shifted against the resistance of said spring.

From the foregoing description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus described my invention, what I claim as new, and desire to secure by Letters Patent, is:

1. An adjustable plow hitch for tractors comprising a guide member of U-shaped form attachable to the rear portion of the frame of a tractor adjacent to the operator's seat, a pulley movable along the same, a clevis connected to said pulley and adapted for connection with a plow draft bar, a supporting plate, a yoke having top and bottom portions above and below said pulley and connected to said pulley and clevis, said yoke having a vertically disposed portion projecting laterally, an attaching plate adapted to be mounted upon the frame of the tractor, a lever pivoted thereto and projecting below said plate, a compensating connection between the lower end of the lever and the yoke, said lever having a notched quadrant and a latch mechanism to hold the same in adjusted position.

2. An adjustable plow hitch for tractors comprising a guide member of U-shaped form attachable to the rear portion of the frame of a tractor adjacent to the operator's seat, a pulley movable along the same, a clevis connected to said pulley and adapted for connection with a plow draft bar, a supporting plate, a yoke having top and bottom portions above and below said pulley and connected to said pulley and clevis, said yoke having a vertically disposed portion projecting laterally, an attaching plate adapted to be mounted upon the frame of the tractor, a lever pivoted thereto and projecting below said plate, a compensating connection between the lower end of the lever and the yoke, a notched quadrant supported by said plate, a latch mechanism carried by the lever and coöperating with said notched quadrant, and a spring connected to the clevis pin and adapted for connection with the frame at one side opposite the lever, as and for the purposes specified.

In testimony whereof I affix my signature hereto.

CHESTER V. SIEGERT.